US007421375B2

(12) United States Patent
Kwon

(10) Patent No.: US 7,421,375 B2
(45) Date of Patent: Sep. 2, 2008

(54) ORGANIC ELECTROLUMINESCENT DEVICE AND DRIVING METHOD THEREOF

(75) Inventor: Byoung Ik Kwon, Seongnam (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 11/435,736

(22) Filed: May 18, 2006

(65) Prior Publication Data

US 2007/0057879 A1 Mar. 15, 2007

(30) Foreign Application Priority Data

Sep. 15, 2005 (KR) ..................... 10-2005-0086197

(51) Int. Cl.
*G09G 5/10* (2006.01)
*G09G 5/00* (2006.01)
*G06F 19/00* (2006.01)

(52) U.S. Cl. ............... 702/189; 340/815.4; 340/815.45; 345/10; 345/20; 345/30; 345/44; 345/45; 345/55; 345/84; 345/204; 345/214; 345/690; 349/1

(58) Field of Classification Search .............. 340/815.4, 340/815.45; 345/10, 20, 30, 44, 45, 46, 55, 345/84, 204, 214, 690; 349/1; 702/1, 127, 702/189

See application file for complete search history.

(56) References Cited

U.S. PATENT DOCUMENTS 3,296,608 A * 1/1967 Feitler et al. .................. 345/55
3,440,637 A * 4/1969 Molnar et al. ................. 345/36
6,369,786 B1 * 4/2002 Suzuki ........................ 345/77
6,583,775 B1 * 6/2003 Sekiya et al. ................. 345/76
6,686,699 B2 * 2/2004 Yumoto ................... 315/169.3
6,858,992 B2 * 2/2005 Park et al. ................ 315/169.3
6,956,547 B2 * 10/2005 Bae et al. ...................... 345/77
6,975,290 B2 * 12/2005 Asano ......................... 345/76
7,019,721 B2 * 3/2006 Thielemans et al. ........... 345/82
7,042,426 B2 * 5/2006 Shin ............................ 345/76
7,358,935 B2 * 4/2008 Yamashita et al. ............ 345/76
2001/0028335 A1 * 10/2001 Hasegawa et al. ............. 345/76
2001/0038371 A1 * 11/2001 Yoshinaga et al. ............ 345/87

(Continued)

FOREIGN PATENT DOCUMENTS

EP 1 061 497 A1 * 12/2000

(Continued)

*Primary Examiner*—Edward R Cosimano
(74) *Attorney, Agent, or Firm*—Morgan, Lewis & Bockius LLP

(57) ABSTRACT

The present invention relates to an organic electroluminescent device and a driving method thereof. The organic electroluminescent device according to the present invention comprises a plurality of scan lines in a first direction, a plurality of data lines in a second direction different from the first direction, a panel having a plurality of pixels formed on crossing areas of data lines and scan lines, and a data driving circuit which drives the pixels according to a display data and a brightness control data inputted from external apparatuses. The data driving circuit comprises a display data recognizing circuit which receives display data from a first external apparatus in the external apparatuses and a current generating circuit which receives brightness control data from a second external apparatus in the external apparatuses, and applies a data current according to the display data recognized in the display data recognizing circuit and the brightness control data to the data lines.

26 Claims, 4 Drawing Sheets

U.S. PATENT DOCUMENTS

2002/0195964 A1* 12/2002 Yumoto .................... 315/169.3
2002/0196211 A1* 12/2002 Yumoto ........................ 345/76
2003/0001806 A1* 1/2003 Bae et al. ....................... 345/77
2003/0001828 A1* 1/2003 Asano ......................... 345/204
2003/0128200 A1* 7/2003 Yumoto ....................... 345/211
2003/0231152 A1* 12/2003 Shin ............................. 345/83
2004/0041525 A1* 3/2004 Park et al. ................ 315/169.3
2005/0116904 A1* 6/2005 Adachi ......................... 345/76
2005/0156828 A1* 7/2005 Yamashita et al. ............ 345/76
2005/0218821 A1* 10/2005 Asano ...................... 315/169.3
2005/0253835 A1* 11/2005 Kawase ....................... 345/207
2005/0258774 A1* 11/2005 Hu ........................... 315/169.3
2006/0119552 A1* 6/2006 Yumoto ........................ 345/76

FOREIGN PATENT DOCUMENTS

FR 2 570 537 A1 * 3/1986
FR 2 627 617 A1 * 8/1989

* cited by examiner

ORGANIC ELECTROLUMINESCENT DEVICE AND DRIVING METHOD THEREOF

BACKGROUND OF THE INVENTION

1. Field of the Invention

The present invention relates to an organic electroluminescent device and a driving method thereof. Particularly, the present invention relates to the organic electroluminescent device capable of preventing screen pause phenomenon occurring when the brightness of pixels is changed, and a driving method thereof.

2. Description of the Related Art

An organic electroluminescent device is a device emitting a light having a predetermined wavelength when a certain voltage is applied thereto.

FIG. 1 is a view showing an organic electroluminescent device in the art.

In FIG. 1, the organic electroluminescent device in the art includes a panel 100, a scan driving circuit 110, a data storage part 120, and a data driving circuit 130.

The panel 100 includes a plurality of pixels E11 to E14, E21 to,E24, E31 to E34, and E41 to E44 formed on an emitting area crossing over data lines D1 to D4 and scan lines S1 to S4. (It is understood that any reference to pixels E11 to E44 in FIG. 1 corresponds to pixels E11 to E14, E21 to E24, E31 to E34, and E41 to E44).

Each of the pixels E11 to E44 is formed with an anode electrode layer, an organic layer and a cathode electrode layer, and emits a light having a certain wavelength when a positive voltage is applied to the anode electrode layer, and a negative voltage is applied to the cathode electrode layer.

The scan driving circuit 110 provides scan signals to each of the scan lines S1 to S4.

The data storage part 120 stores display data and brightness control data inputted from outside. In detail, according to an input order of display data and brightness control data, the data storage part 120 stores the display data and brightness control data to a latch in sequence by using a shift resister (not shown).

The display data is RGB data having the information of colors that the pixels emit.

The brightness control data controls brightness of the pixels E11 to E44. In detail, the brightness control data sets a maximum brightness level that the pixels E11 to E44 can emit, for each of red, green and blue pixels.

The data driving circuit 130 provides a data current according to the display data provided from the data storage part 120 to the data lines D1 to D4. Here, the data current is synchronized with the scan signals.

FIG. 2 is a timing diagram showing the display data signal and the brightness control data signal provided to the data driving circuit of FIG. 1.

When the display data is inputted, the organic electroluminescent device starts to emit a light accordingly.

In FIG. 2, the organic electroluminescent device continues to emit a light by applying the data signal and the scan signals to each of the pixels E11 to E44 from the time S that the display data is inputted. In case the brightness of the pixels E11 to E44 is changed while the light-emitting is continued, the brightness control data according to the changed brightness is inputted to the data storage part 120.

At this time, the display data and the brightness control data are inputted through only one line, and so the input of the display data is discontinued at the section (A) into which the brightness control data (section A) is inputted.

Then, a phenomenon that the light-emitting is temporarily discontinued is occurred at the section A. That is, the screen is paused temporarily. This screen-pause phenomenon is occurred every time the brightness control data is changed.

Thus, there has been a need to develop a device that can prevent the screen-pause phenomenon of the organic electroluminescent device.

SUMMARY OF THE INVENTION

One object of the present invention is to provide an organic electroluminescent device which can prevent screen pause phenomenon when brightness control data is inputted, by dividing the lines through which display data and brightness control data are inputted, and a driving method thereof.

Another object of the present invention is to provide an organic electroluminescent device which can prevent screen pause phenomenon by preventing discontinuance of input of display data when brightness control data is changed, and a driving method thereof The organic electroluminescent device according to the present invention comprises a plurality of scan lines in a first direction, a plurality of data lines in a second direction different from the first direction, a panel having a plurality of pixels formed on crossing areas of data lines and scan lines, and a data driving circuit which drives the pixels according to a display data and a brightness control data inputted from external apparatuses. The data driving circuit comprises a display data recognizing circuit which receives display data from a first external apparatus in the external apparatuses and a current generating circuit which receives the brightness control data from a second external apparatus in the external apparatuses, and applies a data current according to the display data recognized by the display data recognizing circuit, and the brightness control data, to the data lines.

The light-emitting device according to the present invention comprises a panel having a plurality of pixels formed on crossing areas of data lines and scan lines, and a data driving circuit which drives the pixels according to display data and brightness control data inputted from outside. The data driving circuit receives each of display data and brightness control data through different line, and applies a data current according to the display data and brightness control data to the data lines.

The method of driving the electroluminescent device having a plurality of pixels formed on emitting areas crossed by data lines and scan lines comprises receiving each of a display data and a brightness control data through different line and applying a data current corresponding to the display data and brightness control data to the data lines.

The organic electroluminescent device and driving method thereof according to the present invention can prevent screen pause phenomenon occurring when the brightness control data is inputted, by dividing the lines through which the display data and brightness control are inputted.

The organic electroluminescent device and driving method thereof according to the present invention can prevent screen pause phenomenon by preventing discontinuance of input of display data occurring when the brightness control data is changed.

DETAILED DESCRIPTION OF THE INVENTION

The present invention will be more clearly understood from the detailed description in conjunction with the following drawings.

Figure 1:
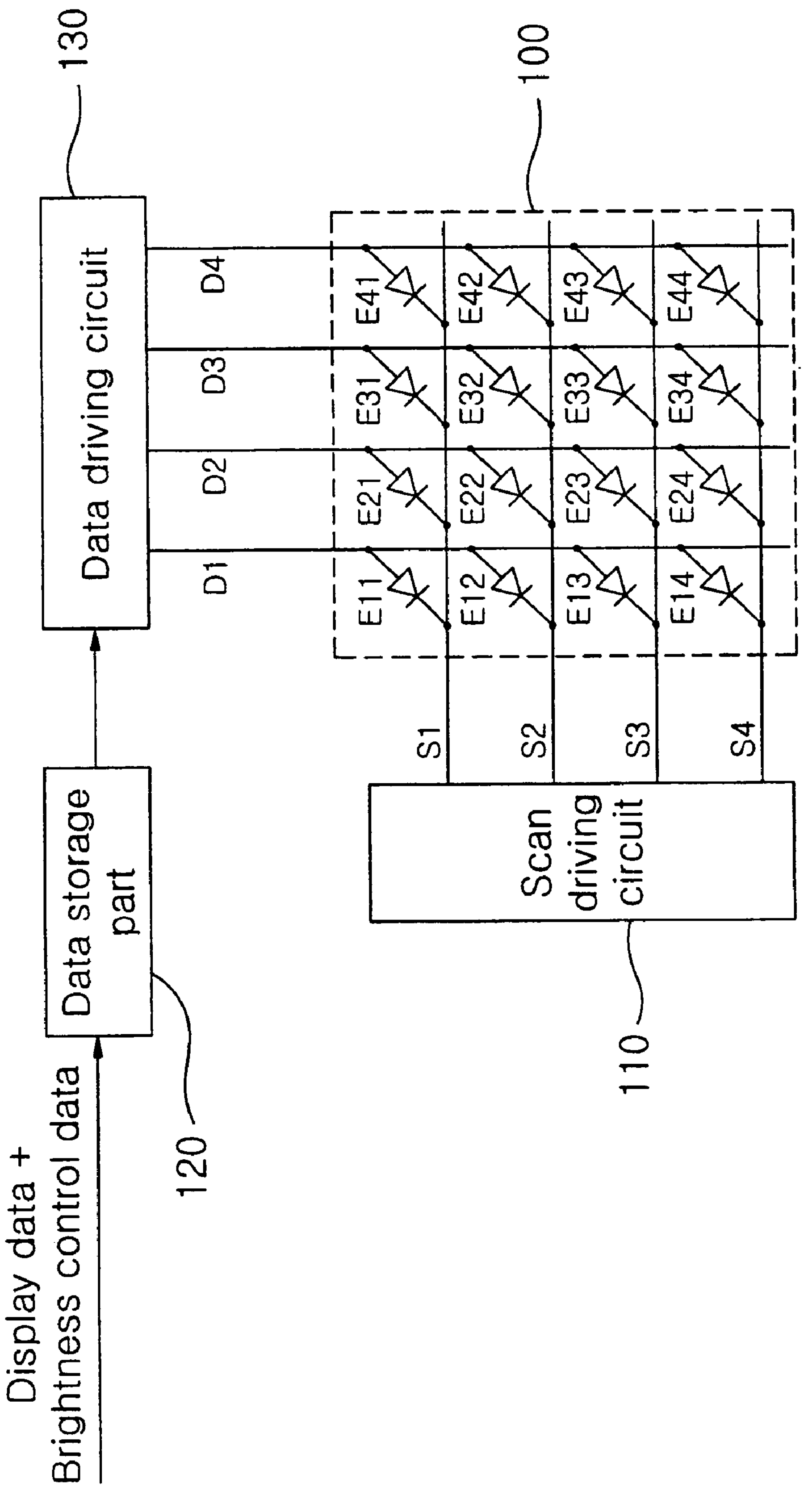
FIG. 1 is a view showing an organic electroluminescent device in the art.
Figure 2:
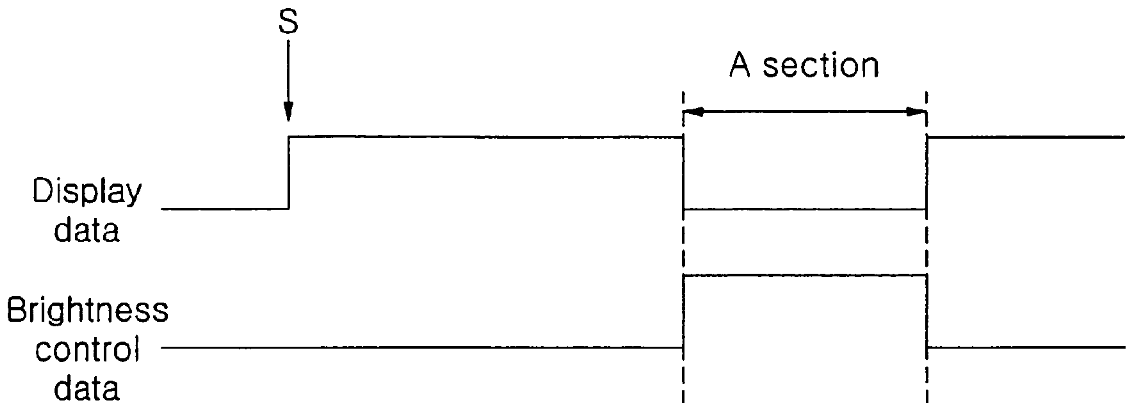
FIG. 2 is a timing diagram showing display data signal and brightness control data signal provided to a data driving circuit of FIG. 1.
Figure 3:
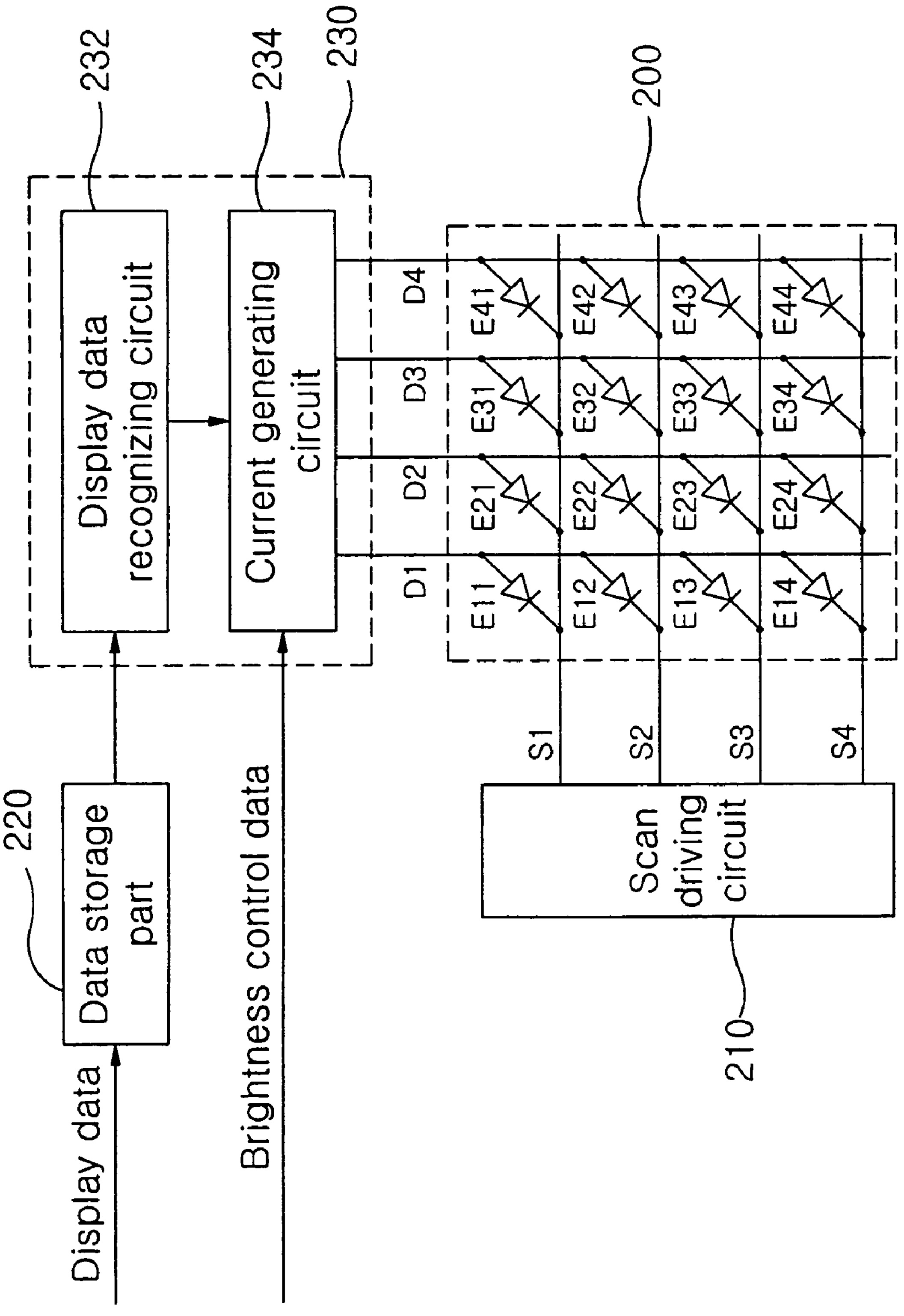
FIG. 3 is a view schematically showing the organic electroluminescent device according to one embodiment of the present invention.
Figure 4:
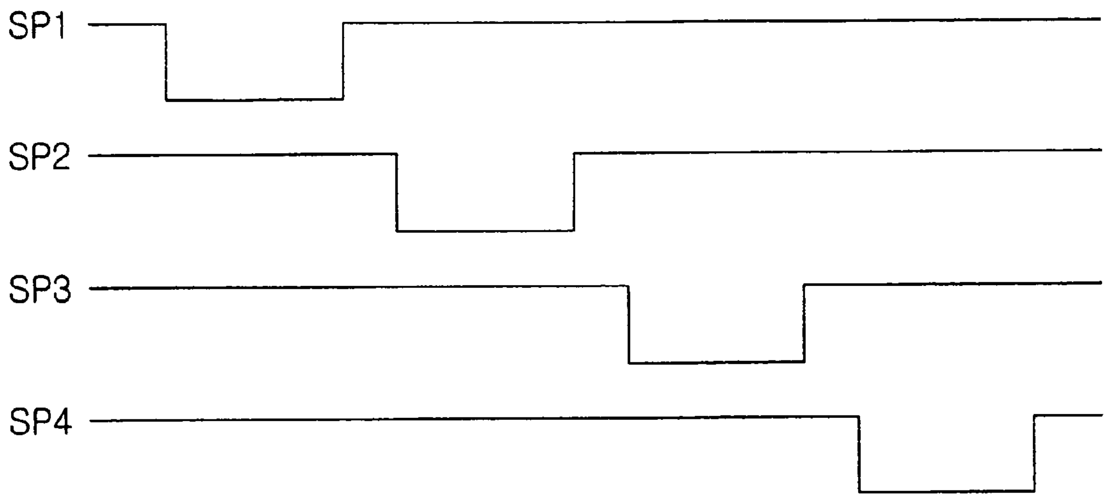
FIG. 4 is a timing diagram showing scan signal provided to the pixels of FIG. 3.

FIG. 3 is a view schematically showing the organic electroluminescent device according to one embodiment of the present invention. And, FIG. 4 is a tiring diagram showing scan signal provided to the pixels of FIG. 3. But, for the convenience of explanation, FIG. 3 described the organic electroluminescent device to have the size of 4 (the width)×4 (the length).

In FIG. 3, the organic electroluminescent device according to one embodiment of the present invention includes a panel 200, a scan driving circuit 210, a data storage part 220 and a data driving circuit 230.

The panel 200 includes a plurality of pixels E11 to E14, E21 to E24, E31 to E34, and E41 to E44 on an emitting area crossing over data lines D1 to D4 and scan lines S1 to S4. (It is understood that any reference to pixels E11 to E44 in FIG. 3 corresponds to pixels E11 to E14, E21 to E24, E31 to E34, and E41 to E44).

Each of the pixels E11 to E44 is formed with an anode electrode layer, an organic layer and a cathode electrode layer, and emits a light having a certain wavelength when a positive voltage is applied to the anode electrode layer and a negative voltage is applied to the cathode electrode layer.

The scan driving circuit 210 provides scan signals SP1 to SP4 to scan lines S1 to S4 in sequence as shown in FIG. 4.

In detail, the scan driving circuit 210 provides the scan signal SP1 to SP4, each having a low logic area and a high logic area, to the scan lines S1 to S4. As a result, the pixels E11 to E44 emit at the low logic area of the scan signals SP1 to SP4.

The data storage part 220 stores a display data inputted from outside. In detail, when the display data is inputted in sequence, the data storage part 220 stores the display data to a latch in sequence by using a shift resister (not shown).

The data driving circuit 230 includes a display data recognizing circuit 232 and a current generating circuit 234.

The display data recognizing circuit 232 recognizes display data provided from the data storage part 220 in sequence. In detail, when the display data is inputted, the display data recognizing circuit 232 determines to which pixel the display data corresponds among the pixels E11 to E44. And, the display data recognizing circuit 232 sends the current generating circuit 234 a signal instructing each of the pixels E11 to E44 to provide a data current according to the display data.

The current generating circuit 234 recognizes the signal provided from the display data recognizing circuit 232, and then provides a data current according to the display data, to the data lines D1 to D4. Here, the data current is synchronized with the scan signals SP1 to SP4.

On the other hand, the brightness control data is inputted to the current generating circuit 234.

The brightness control data controls brightness of the pixels E11 to E44. In detail, it is to set a maximum brightness level that the pixels E11 to E44 can emit, according to each of the red, green and blue pixels.

The current generating circuit 234 provides the data current according to the signal provided from the display data recognizing circuit 232 to the data liens D1 to D4, but such provided data current is adjusted according to the brightness control data.

Hereinafter, the emitting method of the organic electroluminescent device will be described.

Figure 5:
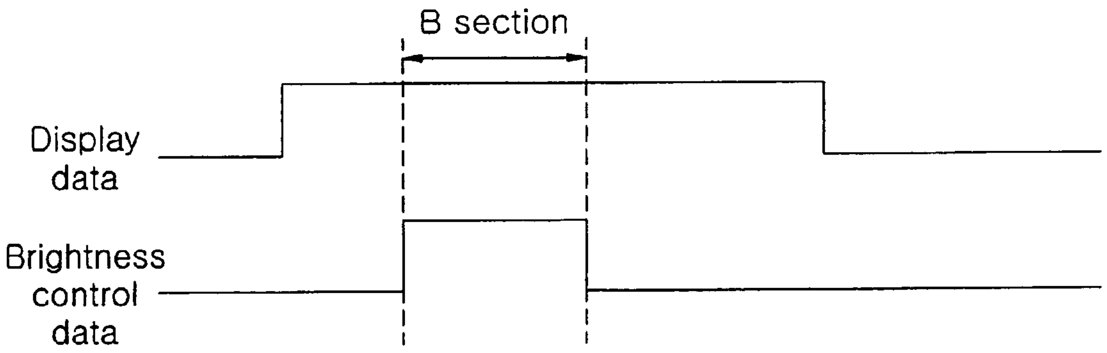
FIG. 5 is a timing diagram showing display data signal and brightness control data signal provided to a data driving circuit of FIG. 3.

FIG. 5 is a timing diagram showing the display data signal and the brightness control data signal provided to the data driving circuit of FIG. 3.

First, inputted display data is stored in the data storage part 220 in sequence. The display data is provided to the display data recognizing circuit 232 in the order stored in the data storage part 220.

The display data recognizing circuit 232 recognizes information of the inputted display data, and transmits a signal instructing the current generating circuit 234 to provide the data current according to the display data to the pixels E11 to E44 emitting a light according to the display data.

The current generating circuit 234 provides the data current to the data lines D1 to D4 according to the signal provided from the display data recognizing circuit 232. At this time, the current generating circuit 234 is set to a maximum output of the data current for the pixels E11 to E44 to emit a light according to the brightness level corresponding to the first inputted brightness control data.

On other hand, when the display data is inputted, the changed brightness control data is inputted into the current generating circuit 234 while the light-emitting of the organic electroluminescent device is continued.

The current generating circuit 234 recognizes the newly inputted brightness control data, and resets a maximum brightness level of each of the pixels E11 to E44 according to the brightness control data.

In FIG. 5, the display data is continuously provided to the current generating circuit 234 through the data storage part 220 and the display data recognizing circuit 232 at the section (section B) that the brightness control data is newly inputted.

That is, the line into which the display data is inputted and the line into which the brightness control data is inputted are divided, and so the display data can be continuously inputted regardless of the input of the brightness control data.

If the maximum brightness level is reset by new brightness control data inputted to the current generating circuit 234, the current generating circuit 234 corresponds the reset maximum brightness level thereafter, and provides the data current having gray scale according to the display data, to the data lines D1 to D4.

From the preferred embodiments for the present invention, it should be noted that modifications and variations can be made by a person skilled in the art in light of the above teachings. Therefore, it should be understood that changes may be made for a particular embodiment of the present invention within the scope and spirit of the present invention outlined by the appended claims.

What is claimed is:

1. An organic electroluminescent device, comprising:

a plurality of scan lines in a first direction;

a plurality of data lines in a second direction different from the first direction;

a panel having a plurality of pixels formed on crossing areas of data lines and scan lines; and a data driving circuit which drives the pixels according to a display data and a brightness control data inputted from external apparatuses, wherein the data driving circuit comprises:

a display data recognizing circuit which receives the display data from a first external apparatus of the external apparatuses; and a current generating circuit which receives brightness control data from a second external apparatus of the external apparatuses, and applies a data current according to the display data recognized in the display data recognizing circuit and the brightness control data to the data lines, wherein the display data recognizing circuit and current generating circuit simultaneously receive the display data and the brightness control data from the first external apparatus and the second external apparatus respectively.

2. The device of claim 1, further including:

a scan driving circuit which provides scan signals to the scan lines.

3. The device of claim 1, further including:

a data storage part which stores RGB data, and then provides the RGB data to the display data recognizing circuit.

4. The device of claim 1, wherein the display data is received by the display data recognizing circuit independently from the brightness control data received by the current generating circuit.

5. The device of claim 1, wherein the display data is received by the data recognizing circuit and the brightness control data is received by the current generating circuit along different signal lines.

6. The device of claim 1, wherein the brightness control data is applied to the pixels through the data current without causing an interruption of the display data, which is also applied to the pixels through the data current.

7. The device of claim 1, wherein the data current continuously applies the display data to the pixels while the brightness control data is simultaneously applied to the pixels, the brightness control data applied without interrupting the display data.

8. The device of claim 1, wherein the data current corresponds to a single current value that represents the brightness control data and display data, the brightness control data applied to the pixels through the data current without interrupting the display data that is simultaneously applied to the pixels through the data current.

9. The device of claim 1, wherein the current generating circuit applies the data current by controlling a maximum brightness of the display data according to the brightness control data.

10. The device of claim 9, wherein the current generating circuit changes the data current of the display data according to a change in the brightness control data and wherein the current generating circuit applies the changed data current to the data lines.

11. A light emitting device comprising:

a panel having a plurality of pixels formed on crossing areas of data lines and scan lines; and a data driving circuit which drives the pixels according to a display data and a brightness control data inputted from one or more external sources, wherein the data driving circuit simultaneously receives each of the display data and the brightness control data through different signal lines, and applies a data current to the data lines according to the display data and the brightness control data received from the different signal lines.

12. The circuit of claim 11, wherein the light emitting device is an organic electroluminescent device.

13. The device of claim 11, wherein the display data is received by the data driving from the different signal lines independently from the brightness control data.

14. The device of claim 11, wherein the brightness control data is applied to the pixels through the data current without causing an interruption of the display data, which is also applied to the pixels through the data current.

15. The device of claim 11, wherein the data current continuously applies the display data to the pixels while the brightness control data is simultaneously applied to the pixels, the brightness control data applied without interrupting the display data.

16. The device of claim 11, wherein the data current corresponds to a single current value that represents the brightness control data and display data, the brightness control data applied to the pixels through the data current without interrupting the display data that is simultaneously applied to the pixels through the data current.

17. The device of claim 11 wherein the data driving circuit applies the data current according to the display data to the data lines by controlling maximum brightness of the display data according to the brightness control data.

18. The device of claim 17, wherein the data driving circuit changes the data current of the display data according to a change in the brightness control data, and wherein the changed data current is applied to the data lines.

19. A method of driving an electroluminescent device having a plurality of pixels formed on crossing areas of data lines and scan lines, comprising:

(a) simultaneously receiving each of a display data and a brightness control data through different signal lines; and (b) applying a data current corresponding to the display data and the brightness control data to the data lines.

20. The method of claim 19, wherein, in (a), the display data is received independently from the brightness control data.

21. The method of claim 19, wherein the display data and the brightness control data are received along different signal lines.

22. The method of claim 19, wherein the brightness control data is applied to the pixels through the data current without causing an interruption of the display data, which is also applied to the pixels through the data current.

23. The method of claim 19, wherein the data current continuously applies the display data to the pixels while the brightness control data is simultaneously applied to the pixels, the brightness control data applied without interrupting the display data.

24. The method of claim 19, wherein the data current corresponds to a single current value that represents the brightness control data and display data, the brightness control data applied to the pixels through the data current without interrupting the display data that is simultaneously applied to the pixels through the data current.

25. The method of claim 19, wherein the data current in (b) is applied by controlling a maximum brightness of the display data according to the brightness control data.

26. The method of claim 25, wherein the data current is changed according to a change in the brightness control data, and wherein the changed data current is applied to the data lines.

* * * * *